(12) United States Patent  (10) Patent No.:  US 9,110,759 B2
Morley  (45) Date of Patent:  Aug. 18, 2015

(54) SOFTWARE ACTIVATION SYSTEMS

(75) Inventor: Jason Barrie Morley, Cambridge (GB)

(73) Assignee: RealVNC Ltd., Cambridge (GB)

( * ) Notice: Subject to any disclaimer, the term of this patent is extended or adjusted under 35 U.S.C. 154(b) by 109 days.

(21) Appl. No.: 13/978,382

(22) PCT Filed: Jan. 18, 2012

(86) PCT No.: PCT/GB2012/050098
§ 371 (c)(1),
(2), (4) Date: Oct. 21, 2013

(87) PCT Pub. No.: WO2012/101424
PCT Pub. Date: Aug. 2, 2012

(65) Prior Publication Data
US 2014/0040876 A1   Feb. 6, 2014

(30) Foreign Application Priority Data

Jan. 24, 2011   (GB) .................................. 1101116.0

(51) Int. Cl.
*G06F 9/445* (2006.01)
*G06F 21/12* (2013.01)

(52) U.S. Cl.
CPC .. *G06F 8/65* (2013.01); *G06F 8/61* (2013.01); *G06F 21/125* (2013.01); *G06F 2221/0742* (2013.01)

(58) Field of Classification Search
None
See application file for complete search history.

(56) References Cited

U.S. PATENT DOCUMENTS 6,199,048 B1   3/2001   Hudetz et al.
7,092,703 B1*  8/2006   Papineau ...................... 455/418
2003/0061515 A1   3/2003   Kindberg et al.
2003/0159136 A1*  8/2003   Huang et al. ................... 717/171
2005/0149341 A1*  7/2005   Eguchi et al. ..................... 705/1
2005/0168742 A1*  8/2005   Jung et al. ..................... 356/419
2006/0161646 A1*  7/2006   Chene et al. ................... 709/223

(Continued)

FOREIGN PATENT DOCUMENTS

WO   2010079195 A1   7/2010
WO   2010119427 A2  10/2010

OTHER PUBLICATIONS

International Application No. PCT/GB2012/050098, Written Opinion mailed Mar. 22, 2012.
International Application No. PCT/GB2012/050098, International Preliminary Report on Patentability mailed Jul. 30, 2013.

(Continued)

*Primary Examiner* — Chameli Das
(74) *Attorney, Agent, or Firm* — Sherppard, Mullin, Richter & Hampton LLP (57) ABSTRACT

We describe a method of activating functionality of an item of software installed on a mobile device, the method comprising: installing said software on said mobile device, wherein said installing includes registering in an operating system of said mobile device a link between an application URI scheme and said software such that a URI having said application URI scheme will be passed to said installed software for processing; scanning a code into said mobile device, wherein said code includes a code URI comprising said application URI scheme and activation data for said item of software; interpreting said application scheme of said code URI using said registered link to pass said code URI to said installed software; and processing said code URI using said installed software to activate a function of said item of software using said activation data in said code URI.

18 Claims, 7 Drawing Sheets

(56) References Cited

U.S. PATENT DOCUMENTS

| | | | |
|---|---|---|---|
| 2006/0165060 A1* | 7/2006 | Dua | 370/352 |
| 2007/0011670 A1* | 1/2007 | Nguyen et al. | 717/168 |
| 2009/0172657 A1* | 7/2009 | Makelainen et al. | 717/174 |
| 2011/0010704 A1 | 1/2011 | Jeon et al. | |
| 2011/0307318 A1* | 12/2011 | LaPorte et al. | 705/14.33 |
| 2012/0324568 A1* | 12/2012 | Wyatt et al. | 726/13 |
| 2013/0128022 A1* | 5/2013 | Bose et al. | 348/77 |
| 2014/0195604 A1* | 7/2014 | Wyatt et al. | 709/203 |
| 2014/0376876 A1* | 12/2014 | Bentley et al. | 386/227 |

OTHER PUBLICATIONS

Parallels Inc., "APS Licensing Aspect," version 1.2, 1999 [retrieved online at http://www.apsstandard.org/doc/aspect-licensing-1.2/ on Jul. 3, 2013].

Great Britain Application No. GB1101116.0, Search Report mailed May 23, 2011.

Great Britain Application No. GB1101116.0, Exam Report mailed Dec. 19, 2011.

International Application No. PCT/GB2012/050098, International Search Report mailed Mar. 22, 2012.

* cited by examiner

SOFTWARE ACTIVATION SYSTEMS

CROSS-REFERENCE TO RELATED APPLICATIONS

This application is a national stage application pursuant to 35 U.S.C. §371 of International Application No. PCT/GB2012/050098, filed Jan. 18, 2012, which claims priority to GB Patent Application No. 1101116.0, filed Jan. 24, 2011, the disclosures of which are hereby incorporated by reference herein.

FIELD OF THE INVENTION

This invention relates to the methods, systems and computer program code for activating software, in particular on a mobile device such as a mobile phone or the like.

BACKGROUND TO THE INVENTION

The App Store of the iPhone provides a relatively controlled environment for selling licensed software. However other platforms and operating systems, in particular Android™ have a more open environment in which software is available from many different vendors, and via many different distribution channels. There is therefore a need for techniques for 'licensing' (or related activities) in such environments. Background prior art can be found in section 2.2 "Schema of Activation Data" of APS Licensing aspect 1,2, 1999, 2009, Parallels Inc.; and in U.S. Pat. No. 6,199,048.

SUMMARY OF THE INVENTION

According to a first aspect of the invention there is therefore provided a method of activating functionality of an item of software installed on a mobile device, the method comprising: installing said software on said mobile device, wherein said installing includes registering in an operating system of said mobile device a link between an application URI scheme and said software such that a URI having said application URI scheme will be passed to said installed software for processing; scanning a code into said mobile device, wherein said code includes a code URI comprising said application URI scheme and activation data for said item of software; interpreting said application scheme of said code URI using said registered link to pass said code URI to said installed software; and processing said code URI using said installed software to activate a function of said item of software using said activation data in said code URI.

Broadly speaking, in embodiments an 'unlicensed' version of the software, for example application software for the mobile device, is acquired from the market place and installed on the mobile device. Also installed on the mobile device is code scanning software, which is typically available from an alternative supplier, for example ZXing Team "Barcode Scanner" software. In some preferred embodiments, as described later, the scanned code is a 2D barcode, preferably in QR Code format, but potentially other code types may alternatively be employed including, but not limited to: an RFID or near field communications code, an OCR (Optical Character Recognition) code, a chip and pin/smart card code. A 2D barcode is, however, particularly useful as, for example, a mobile device with a camera can simply be directed at a printed or screen display version of the code.

The software is configured such that installation of the software registers a custom URI (Uniform Resource Identifier) with the operating system. In particular the URI comprises a custom URI scheme (the top level of the URI naming structure; or where potentially alternative portions of the naming structure could be employed), and in this way when the code scanning software reads and interprets the code as including a URI, this is passed to the operating system which in turn looks up the application URI scheme in an operating system table, which in its turn identifies the application software as being the software to execute for this particular URI scheme (much in the manner of filename extensions). Thus the item of software is executed and has the code URI including the activation data passed to the item of software, which can then validate this activation data prior to unlocking some or all of the functionality of the software.

Thus in embodiments the item of software is run by the operating system in response to interpretation of the scanned code to identify the presence of the application URI in the code. The item of software is configured to, when run, receive the code URI and to process this to determine whether or not to activate the relevant functionality of the item of software. Thus the item of software which is initially retrieved from a third party vendor or distributor may be a generic version of the item of software without, for example, any internal data item unique to the particular item of software which has been retrieved. Instead, in embodiments, the code scanned into the mobile device may include user and/or device-specific data which may then be checked against the user and/or device prior to activating the functionality of the software. For example a code, such as a 2D bar code, may be obtained by the user requesting this code from a server, which may be operated by a controller of the item of software, and the procedure for obtaining the code may include providing user identification data and/or device identification data, which may then be incorporated into the code and checked on the mobile device against local information which may be available or entered by the user. For example the user identification data may simply comprise a user email address; the device identification data may comprise, for example, an IMEI (International Mobile Equipment Identifier) or SIM (Subscriber Identity Module) identifier. In embodiments, however, such a high degree of security may not be needed and in some preferred embodiments the activation data is simply processed to determine whether or not it is in a predefined/allowed format. In embodiments the activation data may include a time stamp so that a time-limited activation, for example a 7 day window, may be implemented.

Thus, in effect, the activation data comprises a flag indicating whether activation is permitted or not, and any data in a valid format will suffice. This is sufficient for many applications where a mere user deterrent rather than strict security is required. The skilled person will appreciate that embodiments of the above described techniques do not require a look-up in a central database, but instead the software/application may be validated without reference to a central database. The validation procedure may in embodiments be straight forward, for example emailing an appropriate 2D barcode. In embodiments the mobile device, for example, mobile phone, itself performs the scanning. Conceptually embodiments of the procedure are more akin to activating the functionality of an item of software than to validating a license, although the end result is similar to validating a license, albeit with a different behind the scenes approach.

Although preferred embodiments of the above described techniques are useful for activating application software on a mobile device such as a mobile phone, mobile computing device, mobile games device or the like, corresponding techniques may also be employed to activate the functionality of an item of software content, for example an item of media software such as video, audio, computer game or the like where the software is configured to install, register, and process the code URI as described above. Potentially the item of software may be a 'license manager' for one or more other items of software.

In embodiments of the above described techniques the code effectively automatically identifies the piece of software which is to be enabled, and at the same time tells the software what to do (enable the function), thus providing a very straightforward and 'clean' user experience. This is further enhanced because the software to be enabled is on the device which performs the scanning so that activation of a function of the software is almost transparent to a user.

In principle other techniques may alternatively be employed to provide a URI incorporating an application-specific URI scheme and accompanying activation data for activating the functionality of an item of software.

Thus in a related aspect the invention provides a method of activating functionality of an item of software installed on a mobile device, the method comprising: installing said software on said mobile device, wherein said installing includes registering in an operating system of said mobile device a link between an application URI scheme and said software such that a URI having said application URI scheme will be passed to said installed software for processing; receiving a code URI at said mobile device, said code URI comprising said application URI scheme and activation data for said item of software; interpreting said application scheme of said code URI using said registered link to pass said code URI to said installed software; and processing said code URI using said installed software to activate a function of said item of software using said activation data in said code URI.

Broadly speaking, the previously described preferred features of embodiments may also be used with embodiments of this aspect of the invention.

In some preferred embodiments the electronic message comprises an email or SMS (Short Message Service) message ("text"). Preferably receiving the code URI at the mobile device comprises receiving an electronic message at said mobile device including the code URI. The user then activates this, for example by clicking on a link, and the operating system (OS) table link then uses the application URI scheme to identify and run the item of software in response to the user activation. The running item of software then processes the activation data passed within the code URI to determine whether or not to activate some or all of the functionality of the item of software.

The invention further provides processor control code to implement the above-described methods, for example on a mobile device microprocessor such as an ARM (Trade Mark) or similar processor or on a digital signal processor (DSP). The code is provided on a carrier such as a disk, CD- or DVD-ROM, programmed memory such as non-volatile memory (eg Flash) or read-only memory (Firmware). Code (and/or data) to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

In a related aspect the invention provides a data carrier carrying application software for a mobile device, the application software having an installation process which configures the software for initiation by a code URI comprising an application URI scheme, the application software comprising software to receive a said code URI, wherein said code URI further comprises activation data for said application software, software to process said activation data to determine whether activation of a function of said application software is permitted, and software to activate said function responsive to said determination.

In a further related aspect the invention provides a mobile device configured to selectively activate a function of an item of software installed on the mobile device, the mobile device comprising: software to receive a code into the mobile device, in preferred embodiments scanning software to scan a code into the mobile device, wherein said code includes a code URI comprising an application URI scheme and activation data for said item of software; and a table of an operating system of said mobile device, said table storing a link between said application URI scheme and said installed item of software; wherein said installed item of software is configured to validate said activation data to activate a function of said installed item of software; and wherein said mobile device is configured such that scanning a said code URI using said scanning software executes said installed item of software to process said scanned code URI to activate a said function.

The invention still further provides a physical or electronic data item comprising activation data formatted into a code URI comprising an application URI scheme followed by the activation data for activating a function of an item of software, in particular as described above.

In some preferred embodiments the data item comprises a 2D bar code, in particular using a QR Code.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Figure 1A:
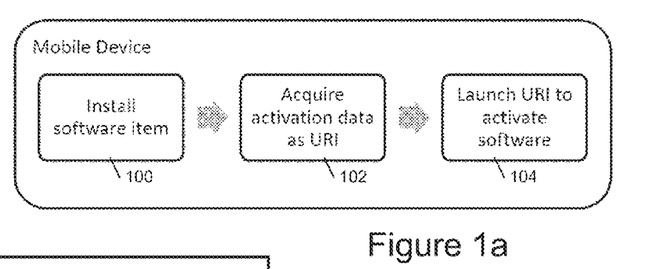
FIGS. 1a and 1b show high level block diagrams of software activation procedures according to embodiments of the invention.

Referring first to FIG. 1a, this shows a high level summary of a procedure according to an embodiment of the invention. Thus, within a mobile device, an item of software is installed (step 100). Then activation data for some or all of the functionality of the item of software is acquired as a URI (step 102) and the URI is launched in order to activate the required functionality of the software (step 104). FIG. 1 shows the software being installed before the URI is acquired, but this is not strictly necessary. The installation and the acquisition simply have to be done before the URI is "launched", but not in any particular order.

Figure 1B:
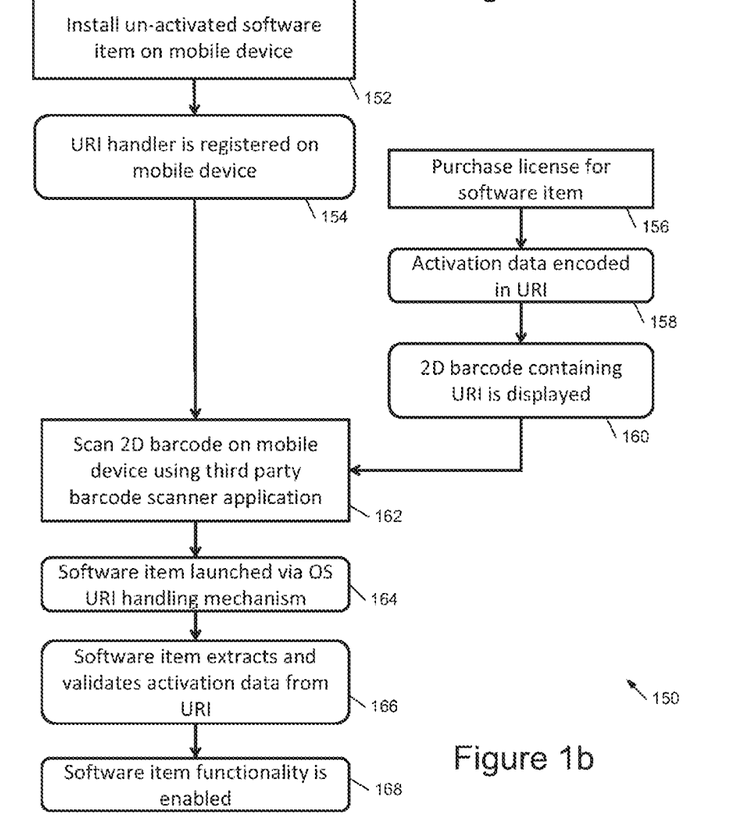

FIG. 1b shows a more detailed summary of one preferred procedure 150 in an embodiment of the invention. Thus at step 152 the un-activated software is installed on the mobile device and the URI handler is registered 154 on the mobile device. Alongside this (either before or after) a licence is purchased 156 for the software item, activation data is encoded 158 in a URI and a 2D barcode containing the URI is displayed 160 (or otherwise made available to the user). Then the 2D barcode is scanned 162 on the mobile device, for example using a third party barcode scanner application, and the software item is launched 164 via the operating system URL handling mechanism. The software item extracts and validates 166 activation data from the URI and (providing the activation data is valid) the functionality of the software item is enabled 168.

Figure 2:
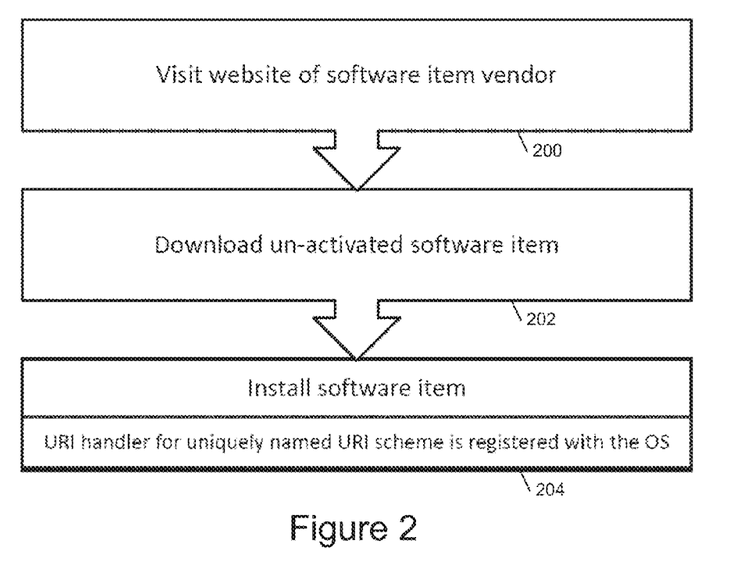
FIG. 2 shows a software install procedure for installing software prior to activation.

Referring now to FIG. 2, this shows an example install procedure in which the user uses the mobile device to visit a website of a vendor of the software item (step 200) and downloads the un-activated software item (step 202). The software item is then installed (step 204), and this includes registering in a table of the operating system (OS) the installed software item as a URI handler for a uniquely named URI scheme of the URI (204). As the skilled person will appreciate, the URI scheme is the top level portion of the URI naming structure immediately before the colon. The item of software which, in embodiments, 'self-activates' is registered to the uniquely named URI scheme, for example, 'vnclicenseviewer://...'. In some preferred embodiments the item of software is uniquely linked to a URI scheme name, but potentially two or more different items of software could be registered to a single scheme name, in which case the software implemented by that scheme name could ask which item of software is to be activated (or licensed).

Figure 3:
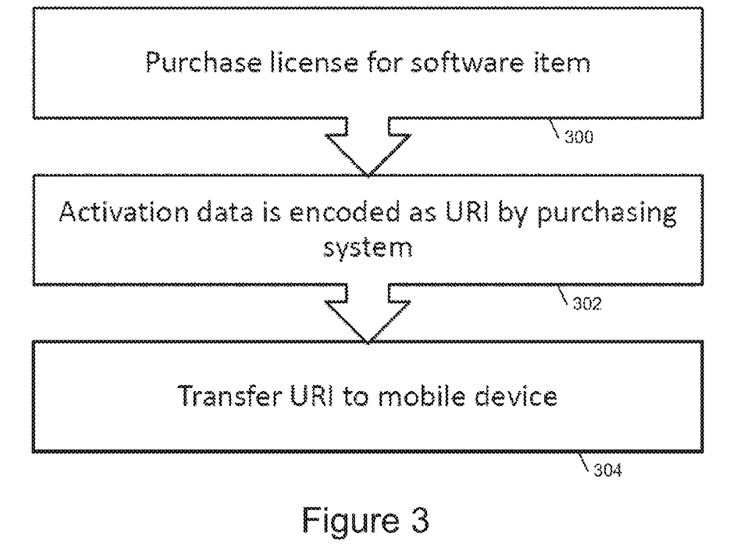
FIG. 3 shows a procedure for acquiring a license or activation data for installed software in the form of a URI (Uniformed Resource Identifier)

The procedure of FIG. 3 illustrates user purchase of a license for the software item. Thus, at step 300, the user goes through a purchase procedure (although in variations of the method, the license may be free). Optionally the purchase procedure may include gathering information regarding the user and/or mobile device, for example a user email address and/or a mobile device IMEI and/or other information which might be employed to characterise the user, device, mobile network or the like. Then at step 302 activation data for the software item is encoded as a URI, for example by the purchasing system or some other server. The encoded activation data may include the user and/or device characterising data and, optionally, other information such as a time stamp. This encoded URI is then provided to the mobile device (step 304) by one of a variety of mechanisms, as described further below.

Figure 4:
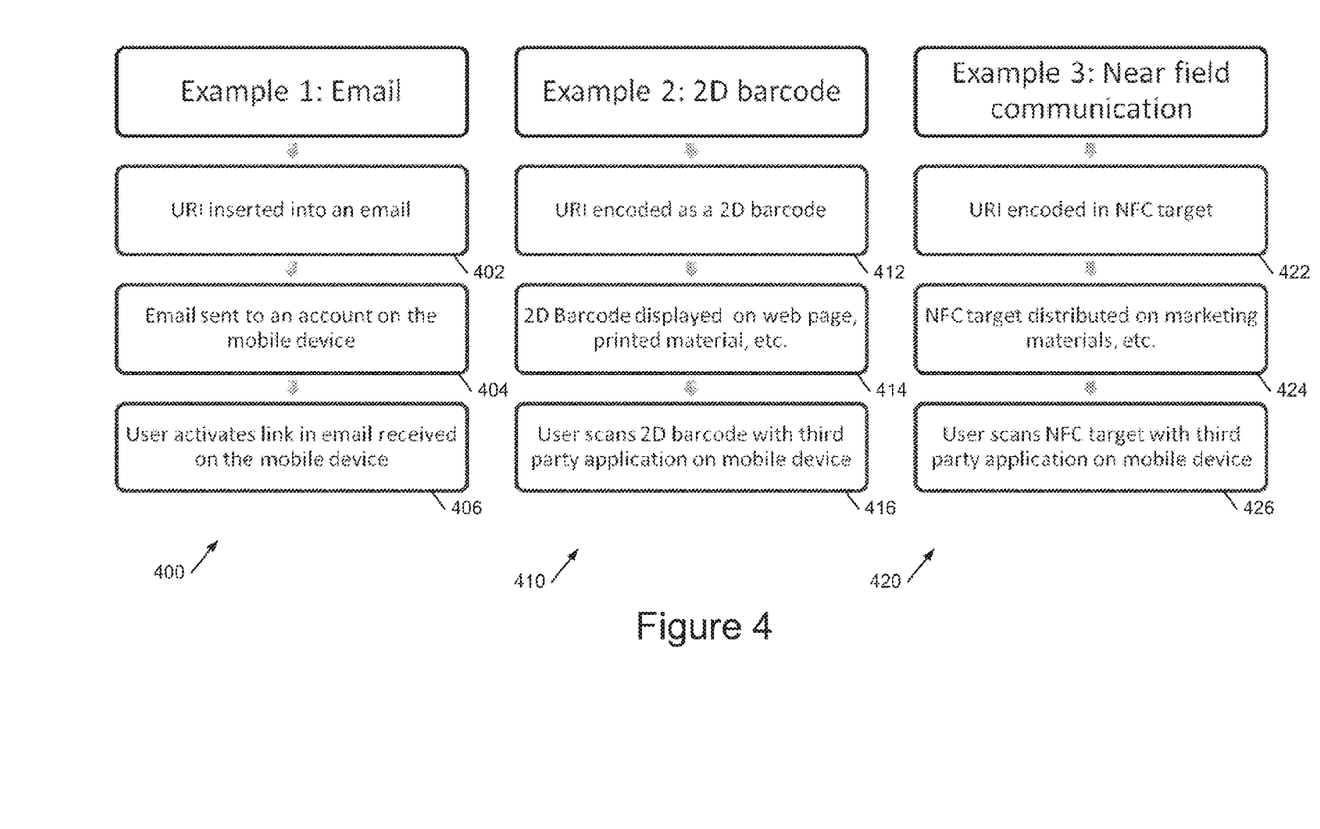
FIG. 4 shows example mechanisms for providing a code incorporating a code URI according to an embodiment of the invention, to a mobile device.

Referring to FIG. 4, this shows three example mechanisms by which a URI may be transferred to a mobile device. In example 1 (400) the URI is inserted into an email (402). Which is sent to an account on the mobile device (404) and the user then activates a link (406) in the email received on the mobile device to activate the software item. In example 2 (410) the URI is encoded as a 2D barcode (412) which is then provided to the user (414), for example by display on a web page (screen), output onto printed material, and/or in other ways. The user then uses a barcode scanning application running on the mobile device (416) to scan the 2D barcode to thereby acquire the URI and run the installed item of software.

In a third example (420) near-field communication is employed and the URL is encoded in an NFC target (422). This NFC target may be distributed in many different ways, for example on marketing materials and the like (424). The user, again running appropriate NFC software on the mobile device (426) then scans the NFC target to acquire the URI. It will be appreciated that the barcode or NFC target scanning application on the mobile device may, and in general will, have a different origin to the software item to be activated/licensed.

Figure 5:
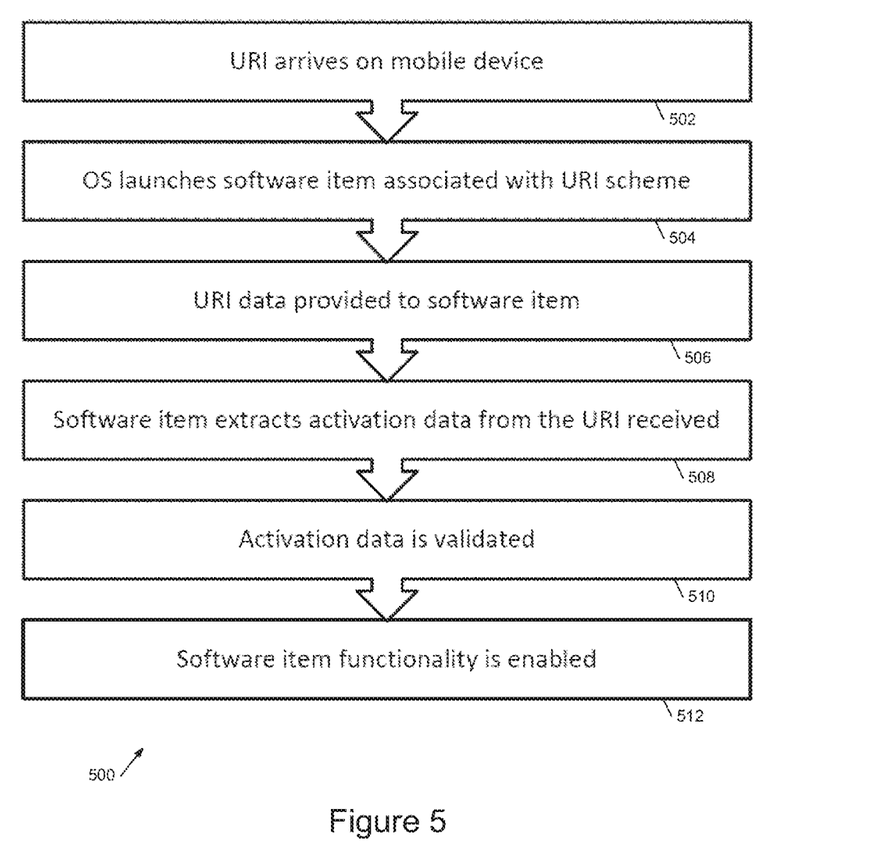
FIG. 5 shows a block diagram of a software function activation procedure using a URI, according to an embodiment of the invention.

Referring next to FIG. 5, this shows a procedure 500 for activating or licensing the item of software according to an embodiment of the invention. Thus the URI arrives on the mobile device (502), for example, as previously described and the URI scheme registered in the OS table causes the OS to launch the software item to be activated/licensed because this is associated with the (unique) URI scheme of the received URI (504). The process of launching the software item causes the OS to provide the URI data to the software item (506), which extracts the activation data from the received URI (508) and validates this data (510). Validation of the activation data may be performed in one of many ways including, but not limited to: checking the format of the activation data, checking that the URI has not expired by checking a time stamp of the activation data, checking user identity data in the activation data against user identification data which may be entered by the user and/or retrieved from storage within the mobile device, checking mobile device identification data within the activation data against mobile device identification data stored within the mobile device, and/or in other ways. Once the activation data has been validated the relevance functionality of the software item may be enabled (512).

Figure 6:
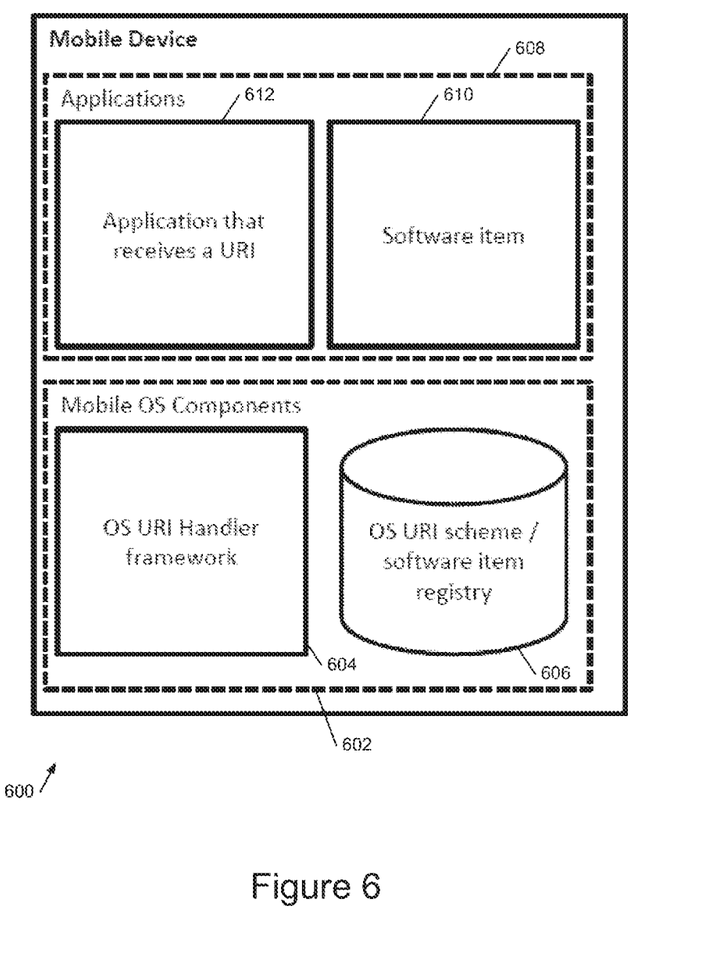
FIG. 6 shows a mobile device configured to implement the procedure of FIG. 5.

FIG. 6 shows an example of a mobile device 600 configured to implement a procedure as described above. Thus the mobile device comprises non-volatile storage storing operating system components 602 comprising, among other things, an OS URI handler framework 604, and a registry 606 storing a link between URI schemes and software, in particular between the scheme name for the software item and the software item. An application storage region 608 of the mobile device stores a software item 610 configured to implement the method of FIG. 5, and an application 612 to receive the URI, for example a 2D barcode scanning application.

Figure 7A:
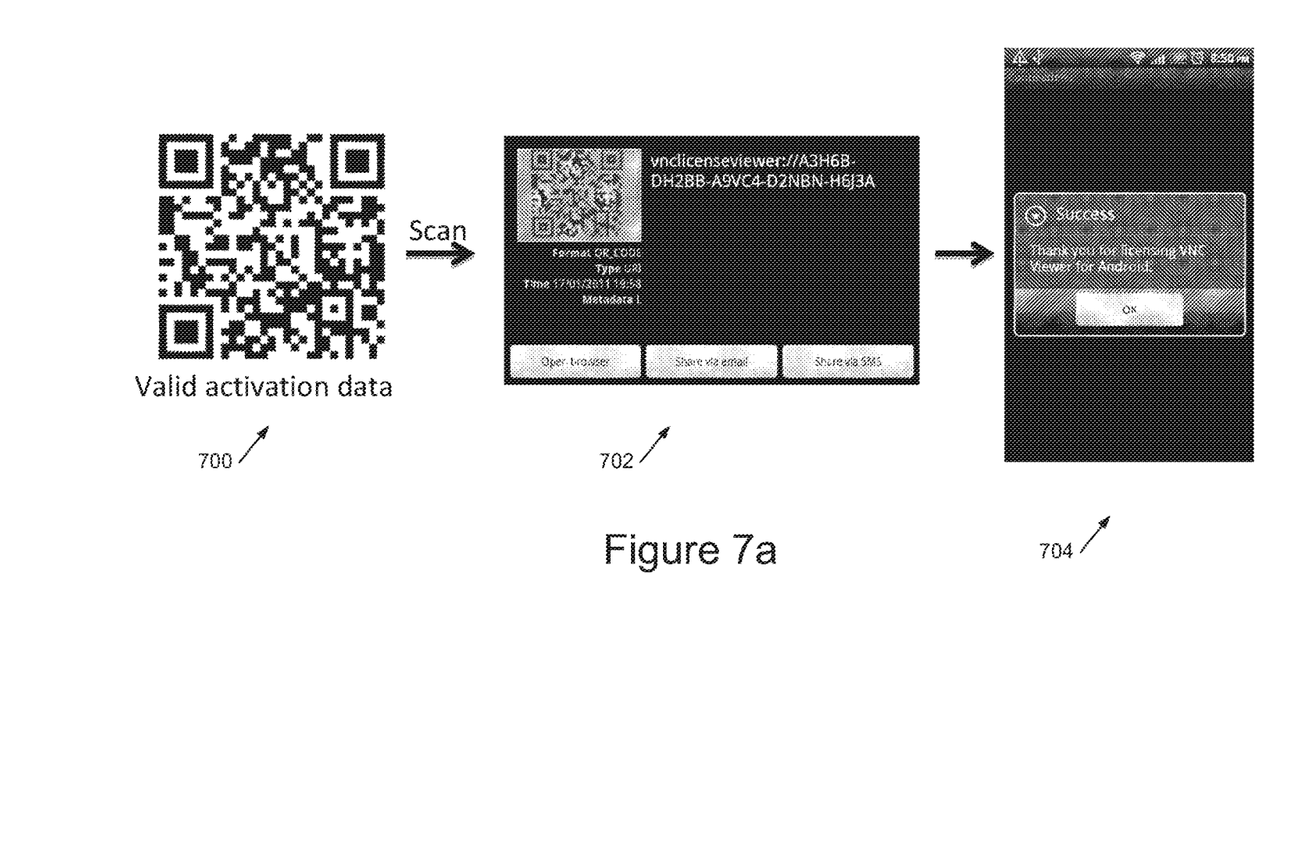
FIGS. 7a and 7b show examples of, respectively valid and invalid activation data incorporated into a URI encoded as a 2D barcode.
Figure 7B:
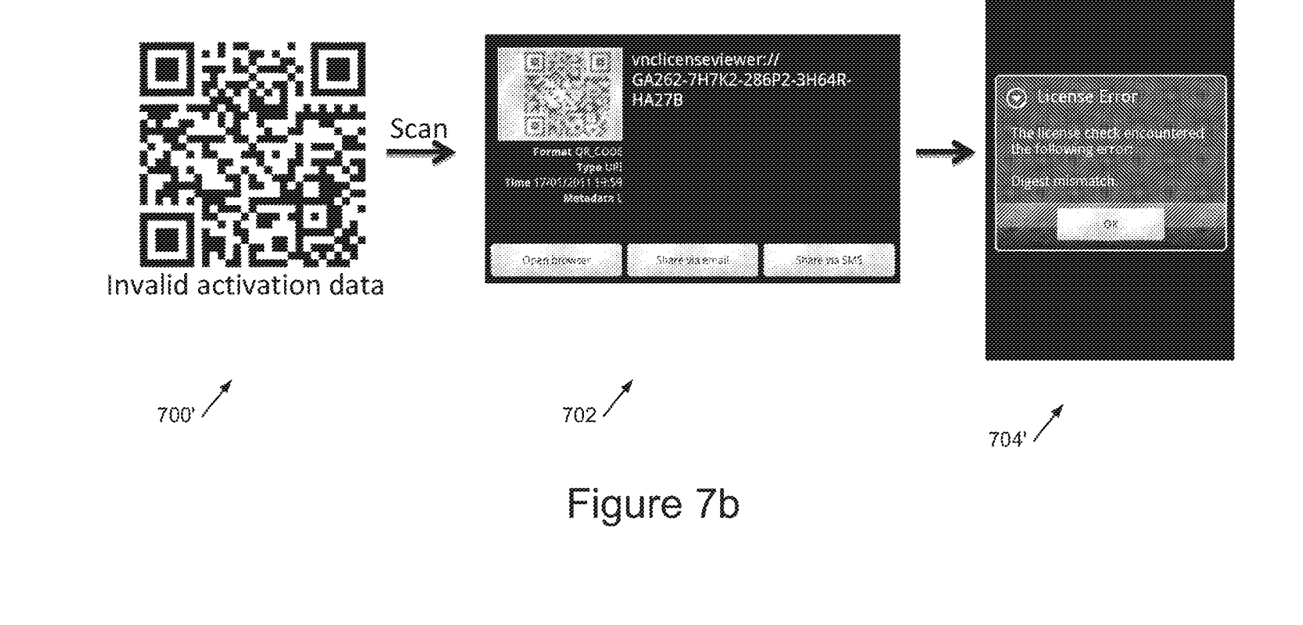

FIGS. 7a and 7b illustrate the procedure in use. Thus in FIG. 7a a 2D barcode 700 comprising a code URI including an application URI scheme (a scheme name linking to the software item) followed by activation data for a function of the item of software. The 2D barcode 700 is scanned to read the code URI into the mobile device, and the scanning software then presents a user interface which (in this example) shows the application URI scheme ('vnclicenseviewer'), and provides the user with an option of opening a browser for the URI. This then causes the item of software to be executed, and the activation data comprised in the code URI is processed to determine whether this data is valid, and if so, provides a screen display to the user indicating successful activation of the function (or licensing) 704. In the example this is a display indicating success or failure, but activation may also be indicated simply by enabling the user to use the item of software.

FIG. 7b shows a similar procedure to FIG. 7a but in which the 2D barcode 700' comprises invalid activation data, so that the resulting screen display 704' to the user indicates a license error.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of enabling functionality of an un-activated item of software installed on a mobile device, the method comprising:

installing said item of software on said mobile device, wherein said installing includes registering in an operating system of said mobile device a link between an application Uniform Resource Identifier (URI) scheme and said item of software, and wherein a URI having said application URI scheme will be passed to said installed software for processing;

scanning a code into said mobile device, wherein said code includes a code URI comprising said application URI scheme and enablement data for said installed item of software; and subsequent to said installing and scanning steps,
interpreting said application URI scheme of said code URI using said registered link to pass said code URI to said installed item of software; and then processing said code URI using said installed item of software to enable a function of said installed item of software using said enablement data in said code URI;

wherein said installed item of software is run by said operating system in response to interpretation of said scanned code to identify presence of said application URI in said code; and wherein said code URI is passed to said installed item of software when said installed item of software is run, and wherein said running of said installed item of software then processes said enablement data passed with said code URI to determine whether to enable said functionality of said installed item of software.

2. A method as claimed in claim 1 wherein said running of said installed item of software processes said enablement data to validate said enablement data by determining whether said enablement data conforms to an allowed format.

3. A method as claimed in claim 1 further comprising:
receiving from a user of said item of software, and forwarding to a server, a request for a said code for scanning, wherein said request for said code for scanning includes user identification data; and
providing to said user a said code for scanning, said enablement data in said code for scanning being dependent on said user identification data;
wherein said processing using said installed item of software processes said enablement data to validate said enablement data using said user identification data.

4. A method as claimed in claim 1 further comprising:
receiving from a user of said item of software, and forwarding to a server, a request for a said code for scanning, wherein said request for said code for scanning includes device identification data of said mobile device; and
providing to said user a said code for scanning, said enablement data and said code for scanning being dependent on said device identification data;
wherein said processing using said installed item of software processes said enablement data to validate said enablement data using said device identification data.

5. A method as claimed in claim 1 further comprising retrieving a generic version of said item of software from a supplier, and wherein said generic version of said installed item of software validates said enablement data without comparing with an internal data item unique to said retrieved generic item of software.

6. A method as claimed in claim 1 wherein said scanning of said code comprises reading a 2D bar code including said code URI.

7. A method as claimed in claim 1 wherein said scanning is performed by said mobile device.

8. A method as claimed in claim 1 wherein said item of software comprises application software for said mobile device.

9. A method as claimed in claim 8 wherein said registering comprises storing a pointer to said application software in a table indexed by said application URI scheme.

10. A method of enabling functionality of an item of software installed on a mobile device, the method comprising:
installing said item of software on said mobile device, wherein said installing includes registering in an operating system of said mobile device a link between an application Uniform Resource Identifier (URI) scheme and said item of software, and wherein a URI having said application URI scheme will be passed to said installed software for processing;
receiving a code URI at said mobile device, said code URI comprising said application URI scheme and enablement data for said installed item of software; and
subsequent to said installing and receiving steps,
interpreting said application scheme of said code URI using said registered link to pass said code URI to said installed item of software; and then
processing said code URI using said installed item of software to enable a function of said installed item of software using said enablement data in said code URI;
wherein said installed item of software is run by said operating system in response to interpretation of said application scheme of said code URI to identify presence of said code URI in said code; and
wherein said code URI is passed to said installed item of software when said installed item of software is run, and wherein said running of said installed item of software then processes said enablement data passed with said code URI to determine whether to enable said functionality of said installed item of software.

11. A method as claimed in claim 10 wherein receiving said code URI at said mobile device comprises receiving an electronic message at said mobile device including said code URI, the method further comprising inputting a user activation of said code URI in said electronic message, and running said installed item of software in response to said user activation.

12. A method as claimed in claim 11 wherein said running of said installed item of software processes said enablement data to validate said enablement data by determining whether said enablement data conforms to an allowed format.

13. A method as claimed in claim 11 further comprising:
receiving from a user of said item of software, and forwarding to a server, a request for a said electronic message, wherein said request for said electronic message includes user identification data; and
providing to said user a said electronic message, said enablement data in said electronic message being dependent on said user identification data;
wherein said processing using said installed item of software processes said enablement data to validate said enablement data using said user identification data.

14. A method as claimed in claim 11 further comprising:
receiving from a user of said item of software, and forwarding to a server, a request for a said electronic message, wherein said request for said electronic message includes device identification data of said mobile device; and
providing to said user a said electronic message, said enablement data and said electronic message being dependent on said device identification data;

wherein said processing using said installed item of software processes said enablement data to validate said enablement data using said device identification data.

15. A method as claimed in claim 10 further comprising retrieving a generic version of said installed item of software from a supplier, and wherein said generic version of said installed item of software validates said enablement data without comparing with an internal data item unique to said retrieved generic item of software.

16. A method as claimed in claim 10 wherein said item of software comprises application software for said mobile device.

17. A method as claimed in claim 16 wherein said registering comprises storing a pointer to said application software in a table indexed by said application URI scheme.

18. A mobile device configured to selectively enable a function of an item of software installed on the mobile device, the mobile device comprising:
    software to receive a code into the mobile device, wherein said code includes a code Uniform Resource Identifier (URI) comprising an application URI scheme and enablement data for said installed item of software, and wherein said software to receive said code comprises: scanning software to scan said code into said mobile device, interpreting software to interpret said application scheme of said code URI using a registered link to pass said code URI to said installed item of software, and processing software to process said code URI using said installed item of software to enable a function of said installed item of software using said enablement data in said code URI; and
    a table of an operating system of said mobile device, said table storing a link between said application URI scheme and said installed item of software;
    wherein said installed item of software is configured to validate said enablement data to enable a function of said installed item of software;
    wherein said mobile device is configured such that scanning a said code URI using said software executes said installed item of software to process said scanned code URI to enable said function;
    wherein said installed item of software is run by said operating system in response to interpretation of said scanned code to identify presence of said application URI scheme in said code; and
    wherein said code URI is passed to said installed item of software when said installed item of software is run, and wherein said running of said installed item of software then processes said enablement data passed with said code URI to determine whether to enable said functionality of said installed item of software.

* * * * *